United States Patent [19]

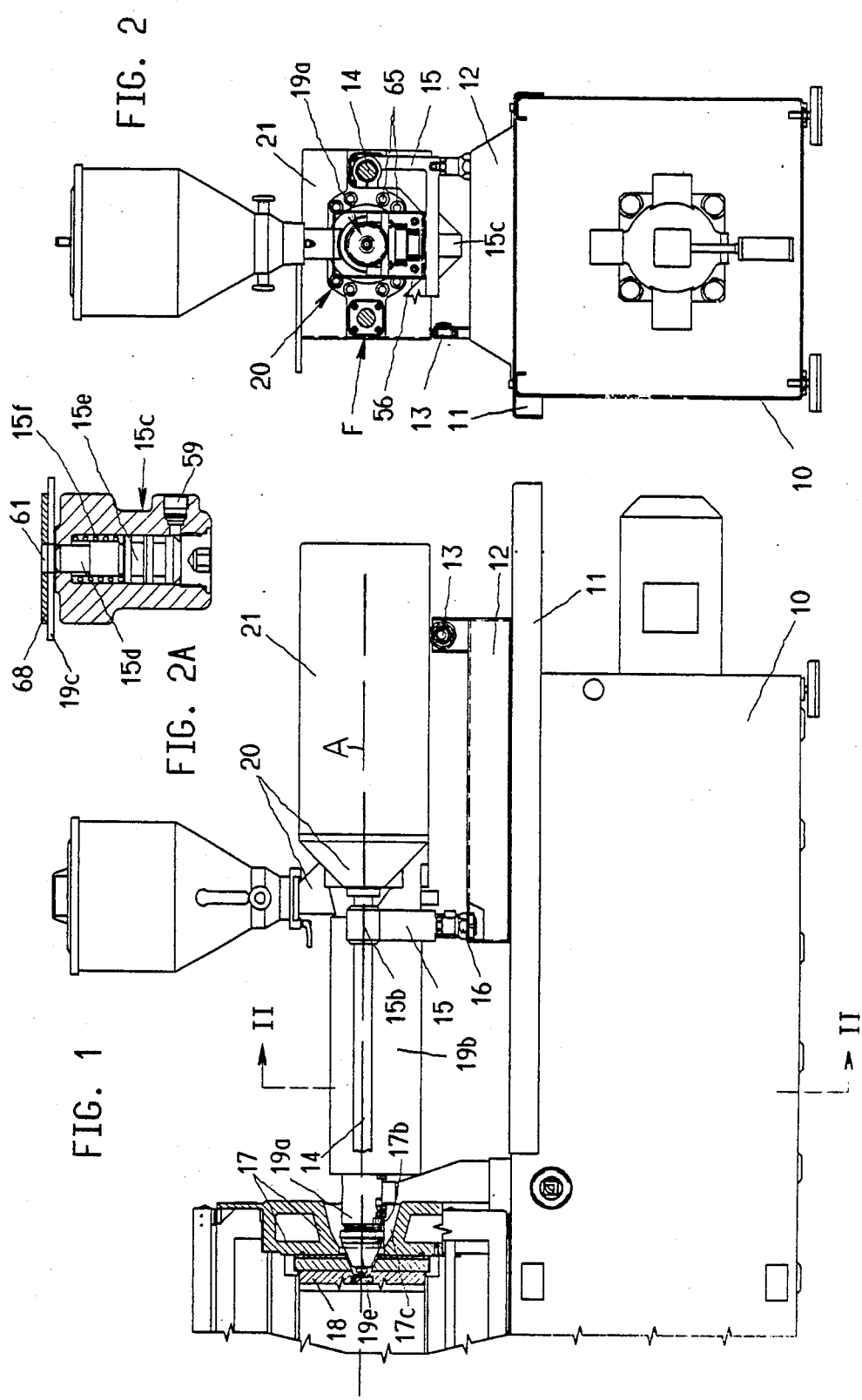

Hehl

[11] Patent Number: 4,708,622
[45] Date of Patent: Nov. 24, 1987

[54] INJECTION MOLDING UNIT

[76] Inventor: Karl Hehl, Artur-Hehl-Strasse 32, D-7298 Lossburg 1, Fed. Rep. of Germany

[21] Appl. No.: 852,338

[22] Filed: Apr. 15, 1986

[30] Foreign Application Priority Data

Apr. 15, 1985 [DE] Fed. Rep. of Germany ....... 3513411
Jul. 26, 1985 [DE] Fed. Rep. of Germany ....... 3526710

[51] Int. Cl.$^4$ ............................................. B29C 45/54
[52] U.S. Cl. ................................ 425/185; 425/192 R; 425/574; 425/587
[58] Field of Search ................... 425/185, 192 R, 542, 425/183, 567, 574, 575, 585–587, 595

[56] References Cited

U.S. PATENT DOCUMENTS

| | | | |
|---|---|---|---|
| 3,526,931 | 9/1970 | Schwartz | 425/192 |
| 3,596,325 | 8/1971 | Hehl | 425/192 |
| 3,788,788 | 1/1974 | Hehl | 425/192 |
| 4,473,346 | 9/1984 | Hehl | 425/192 X |

FOREIGN PATENT DOCUMENTS 3229223 4/1983 Fed. Rep. of Germany .
3447597 8/1986 Fed. Rep. of Germany .

Primary Examiner—Richard L. Chiesa
Attorney, Agent, or Firm—Spencer & Frank

[57] ABSTRACT

An injection molding machine includes an injection mold assembly, an injection molding unit, and a drive for inserting the injection molding unit on and withdrawing it from the injection mold assembly. The injection molding unit includes a carrier block, a plasticizing cylinder projecting into a central longitudinal bore of the carrier block, a feed screw coaxially received in the plasticizing cylinder, and a coupling for releasably axially immobilizing the plasticizing cylinder in the carrier block. The coupling has a plurality of locking bolts radially slidably supported on radial guide faces of the carrier block. The locking bolts have a locking position in which they project into a circumferential locking groove of the plasticizing cylinder and an unlocking position in which the locking bolts are, by a drive, radially withdrawn from the circumferential locking groove. A drive is operatively connected to the plasticizing cylinder for moving it out of the carrier block in the course of an axial releasing stroke. There is further provided a stationarily held support component supporting the plasticizing cylinder after removal thereof from the carrier block during the releasing stroke, and a stationarily supported stopping device arranged to be brought into an abutting engagement with the plasticizing cylinder externally of the carrier block for stopping the plasticizing cylinder when it is withdrawn from the injection mold assembly.

21 Claims, 31 Drawing Figures

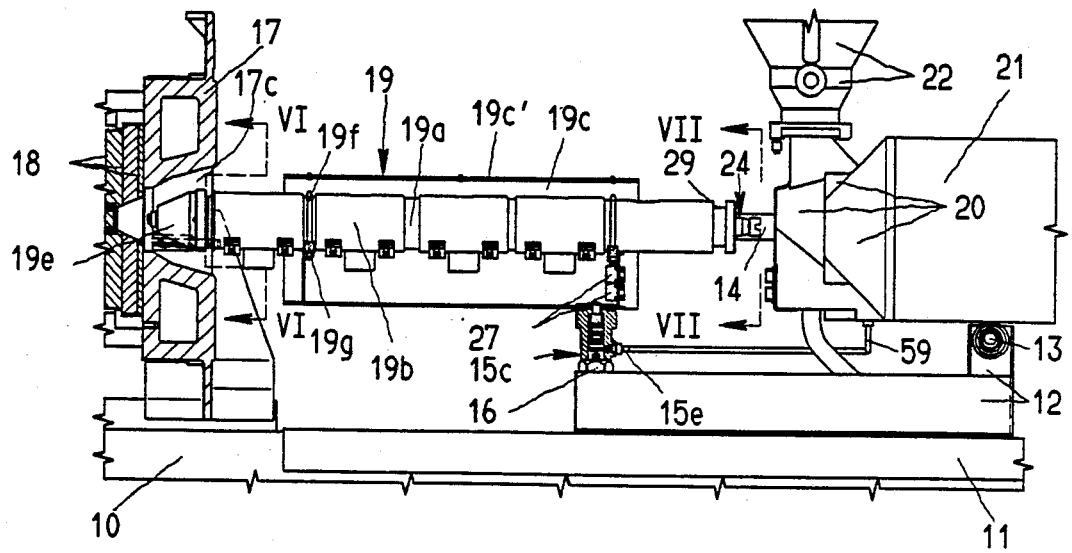

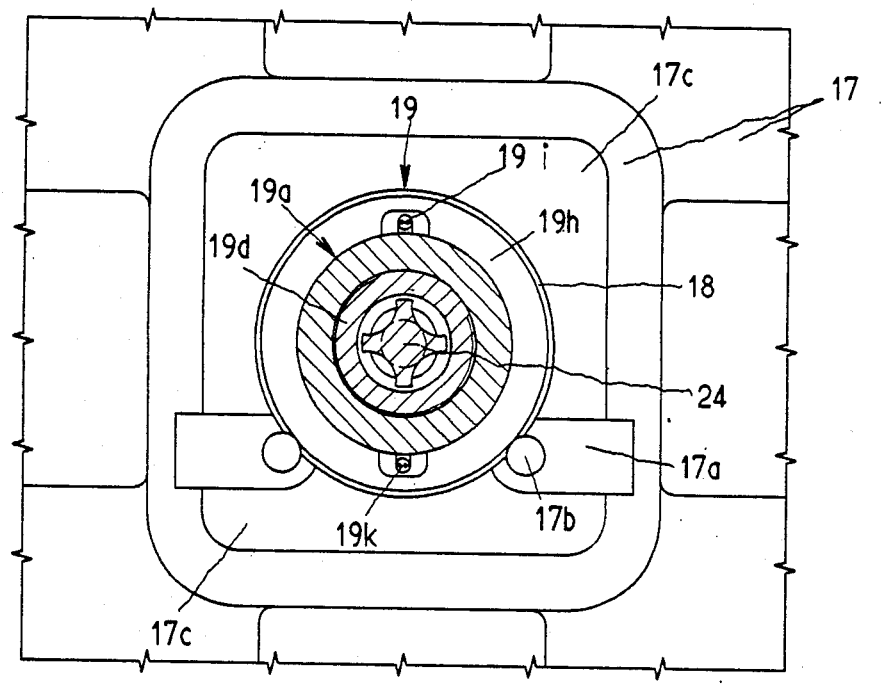
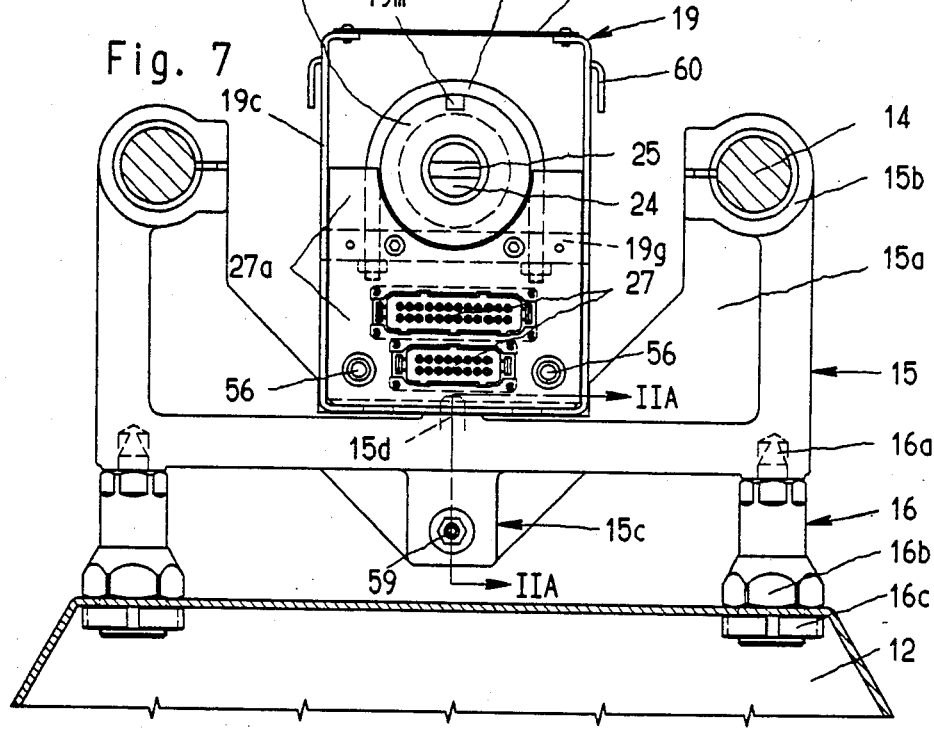

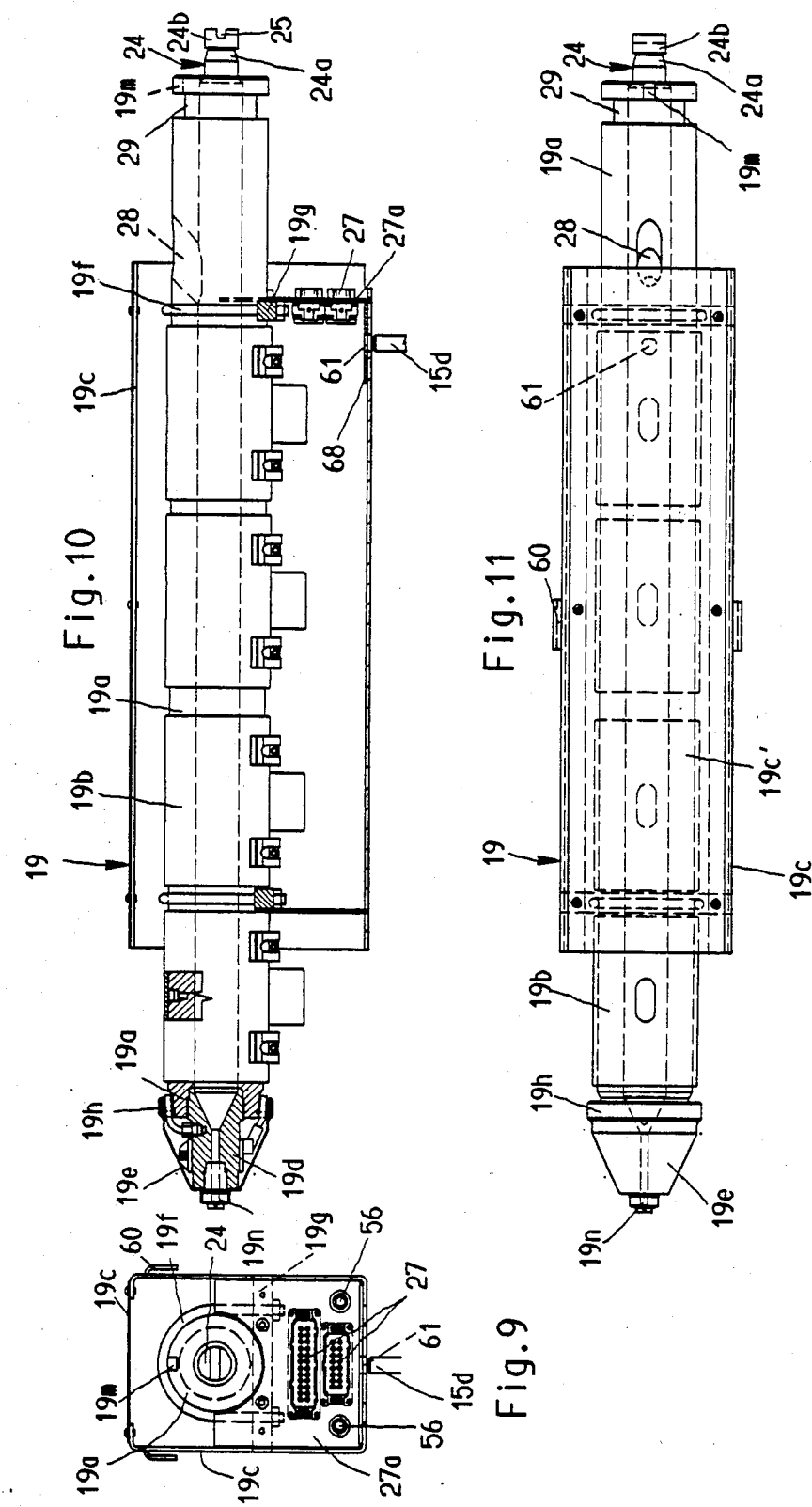

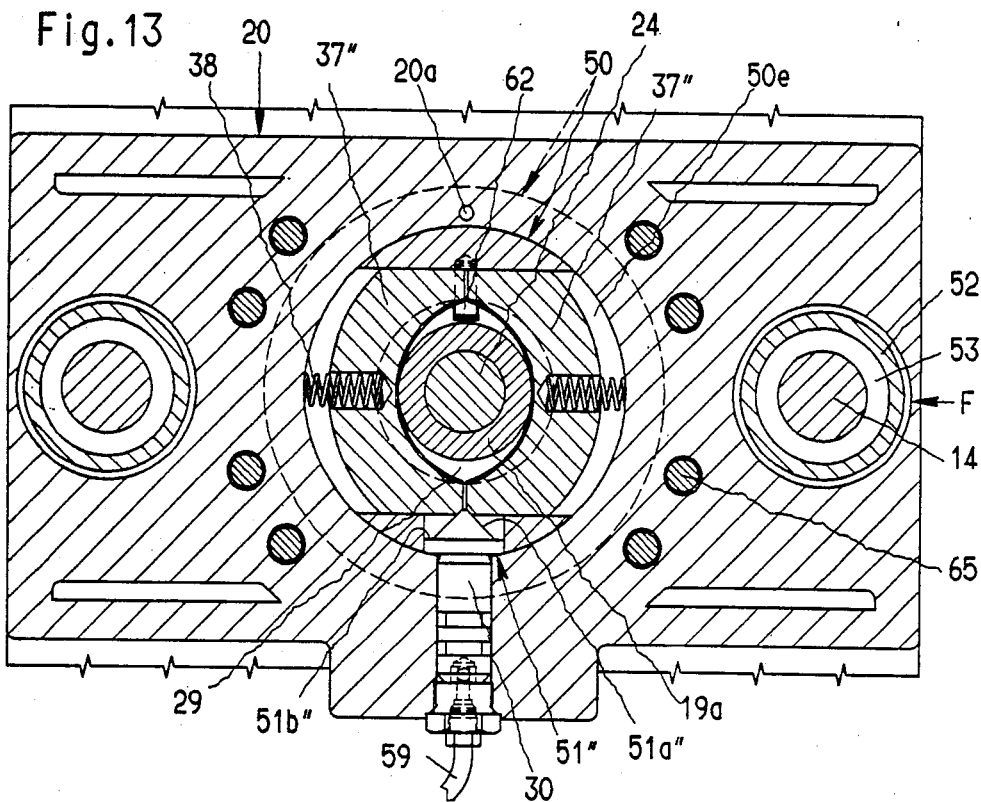
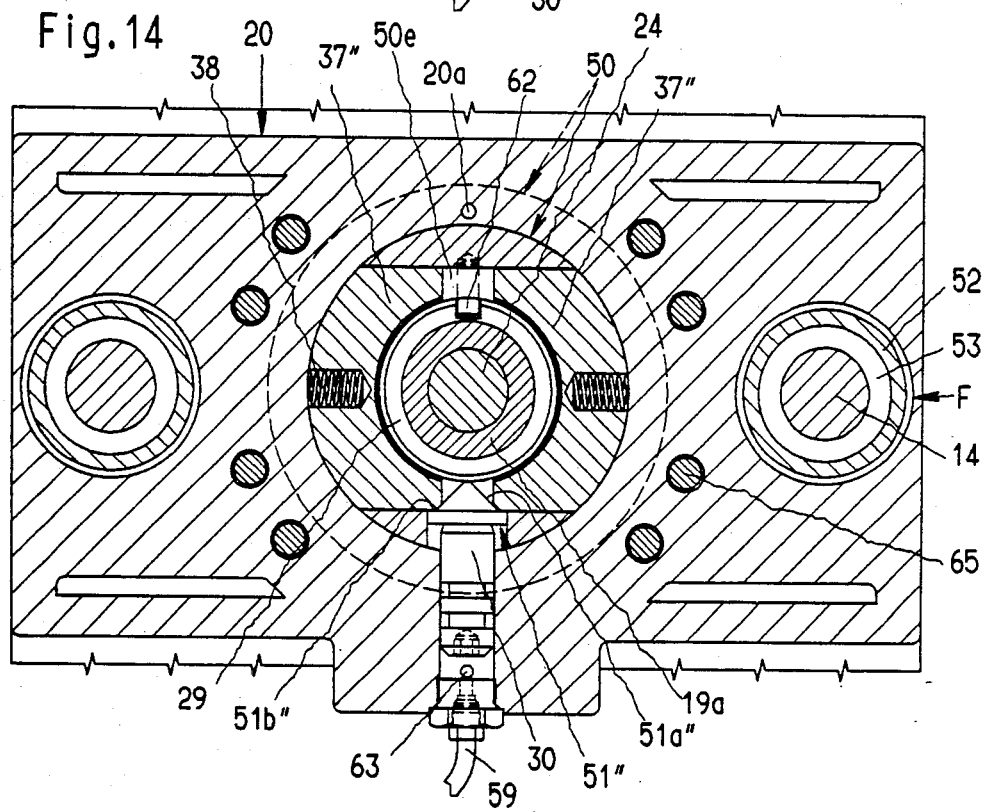

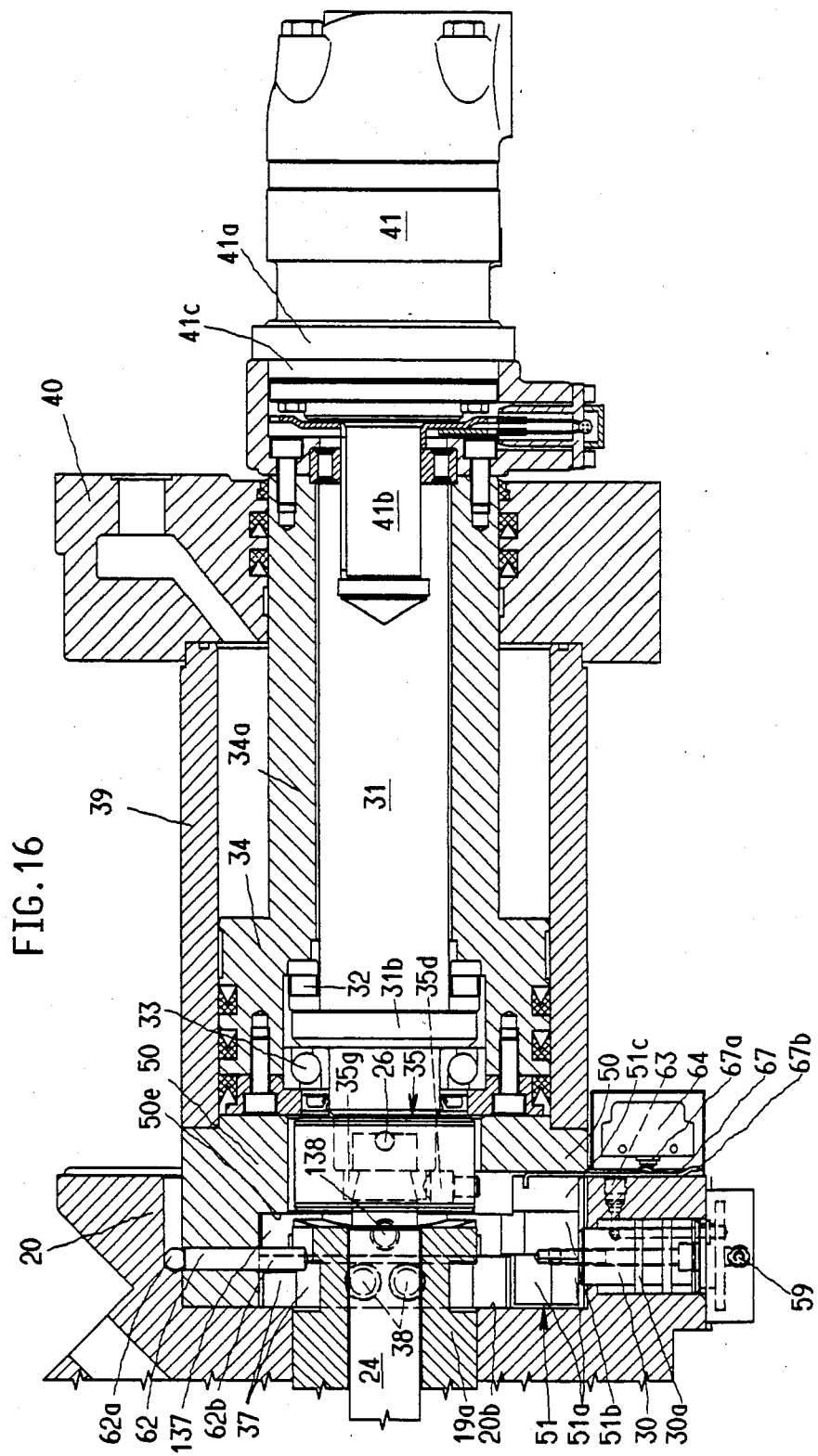

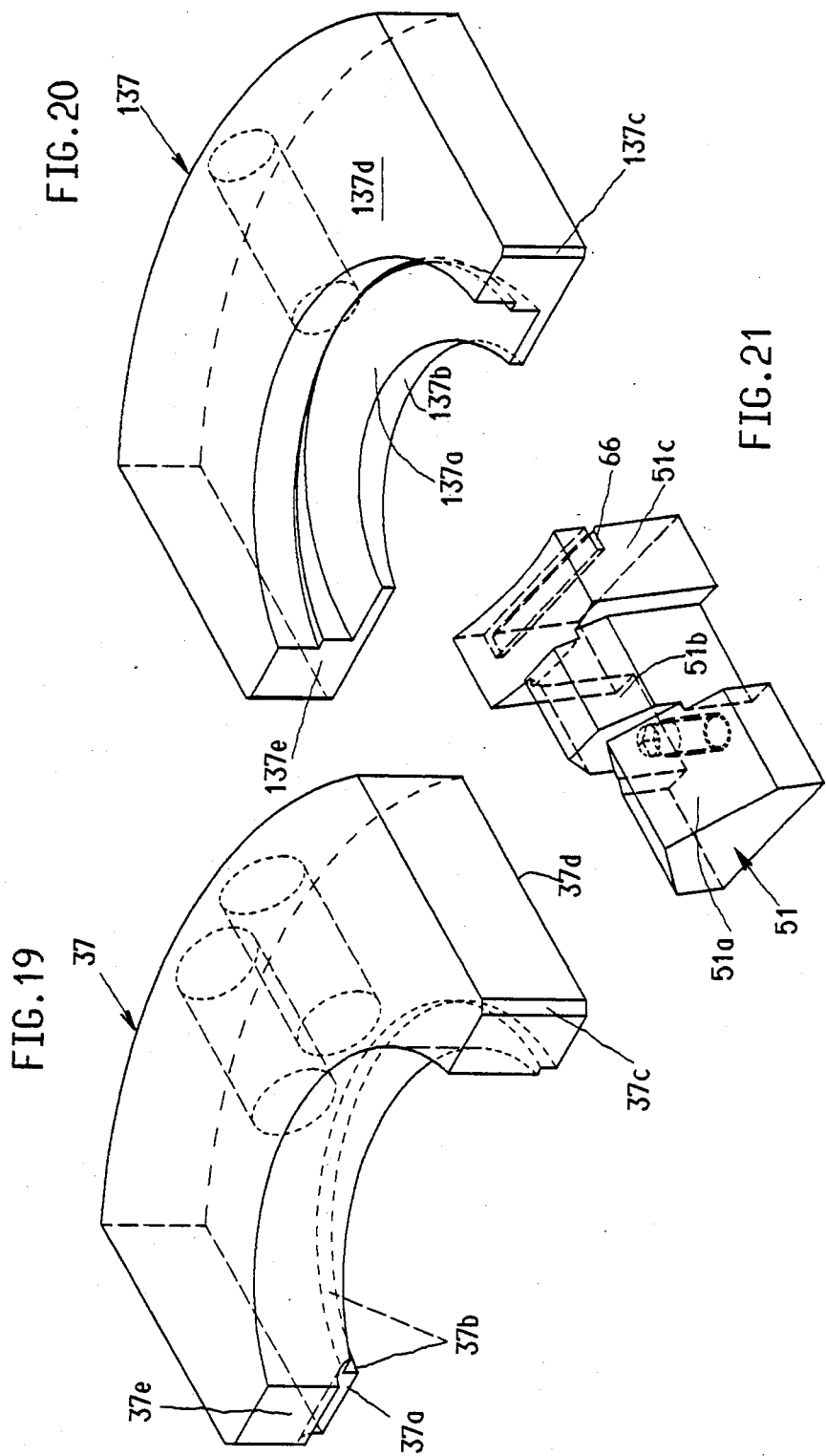

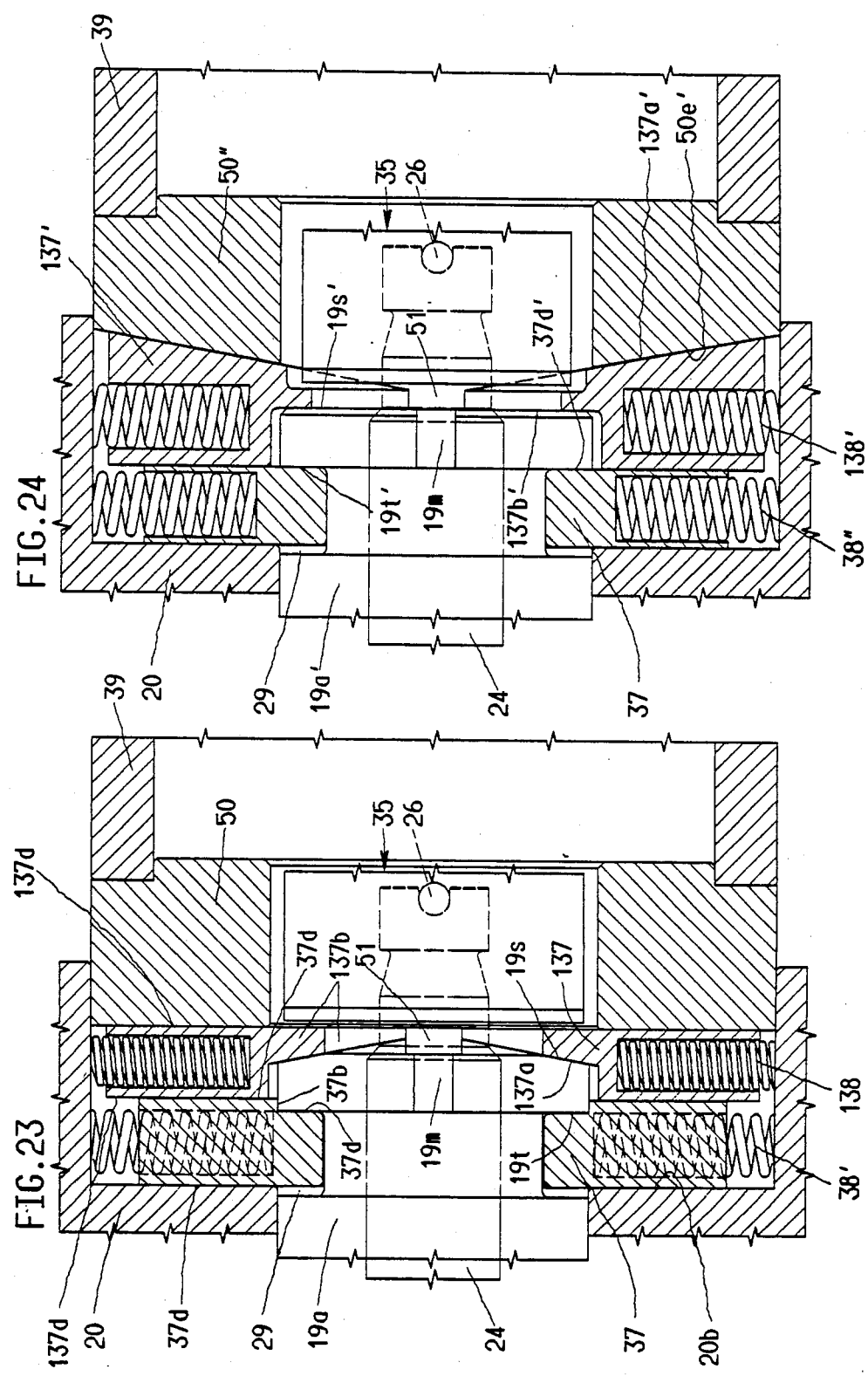

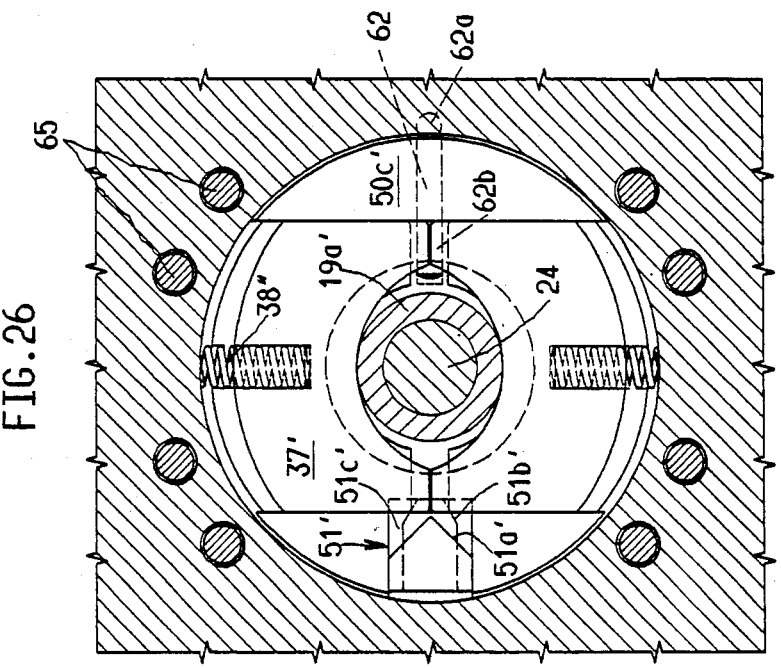
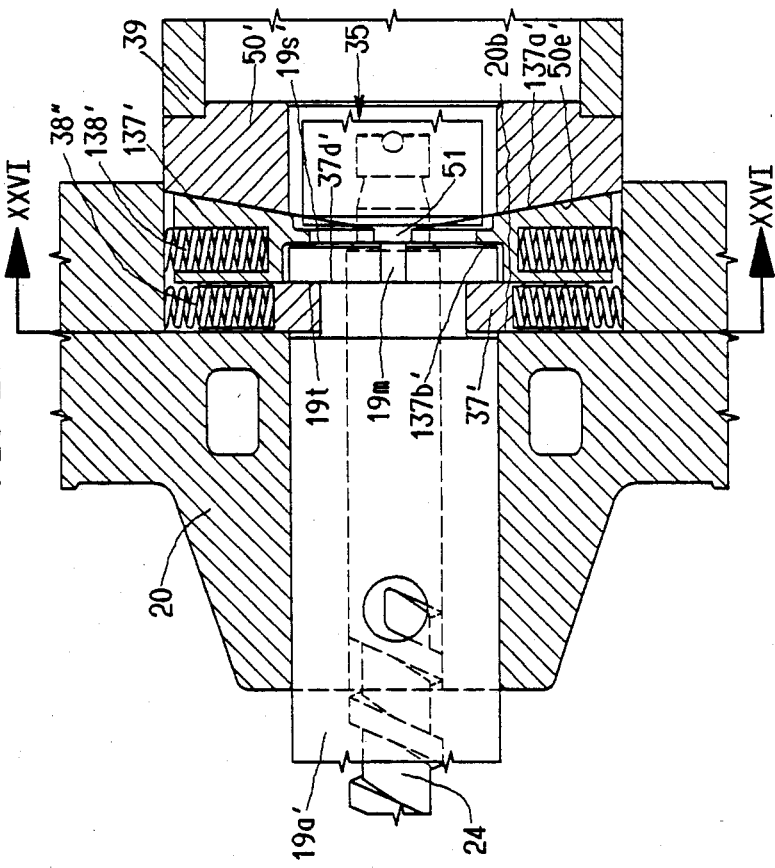

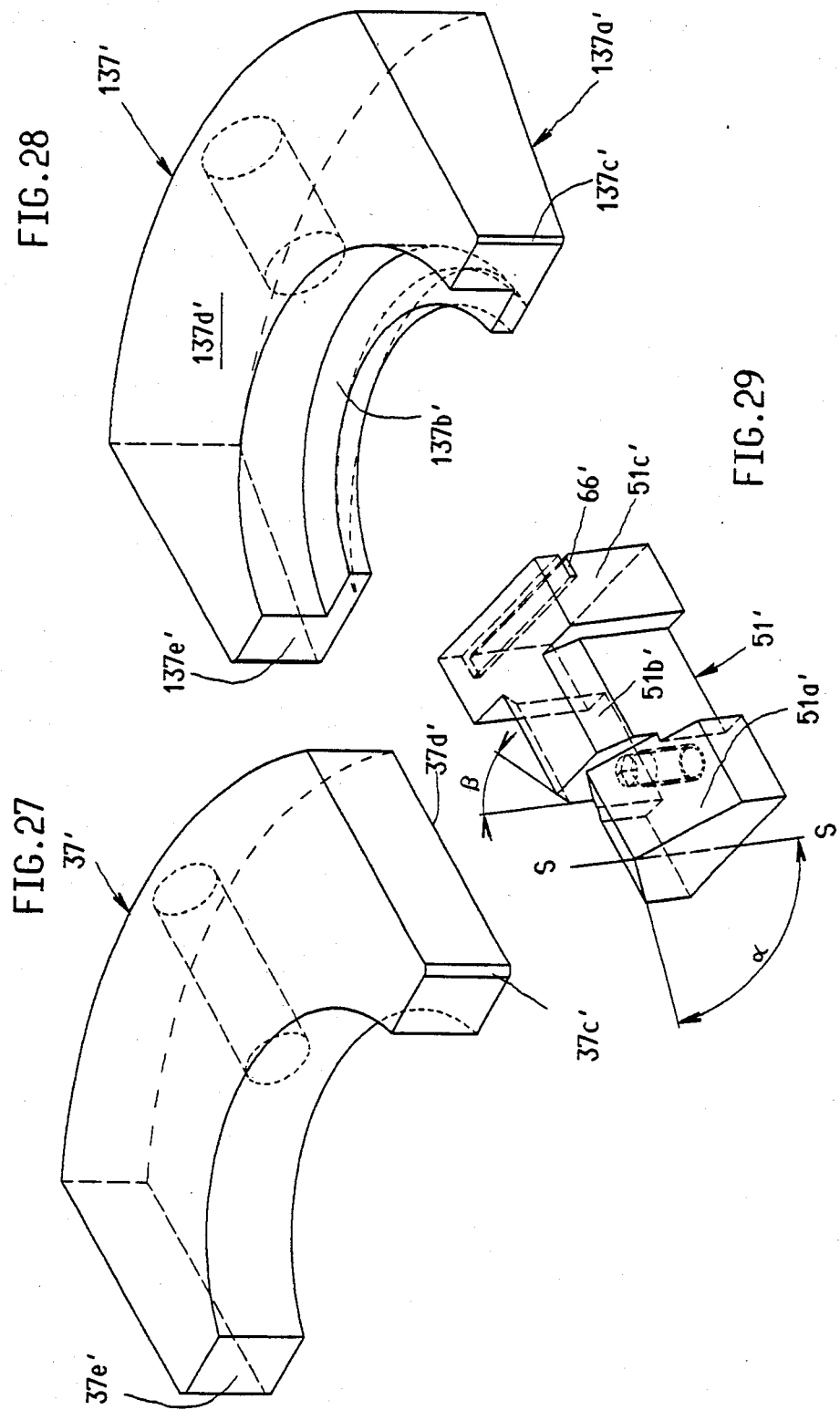

INJECTION MOLDING UNIT

BACKGROUND OF THE INVENTION

This invention relates to an injection molding unit which has at least one driving cylinder for inserting the unit in or removing it from an injection mold assembly received in a mold closing unit of an injection molding machine. The injection molding unit further has a hydraulic injection cylinder for performing injection strokes of a feed screw which is axially displaceably received in the plasticizing cylinder of the injection molding unit and which is provided with a drive for rotating the same. The injection molding unit also has a carrier block which cooperates with the plasticizing cylinder and which is axially displaceable on stationary columns. The carrier block has a supply device for the synthetic material as well as a central bore into which the plasticizing cylinder projects in a form-fitting manner and is axially immobilized therein. The injection molding unit further comprises a coupling device which includes radially slidable locking bolts for a centrally controllable replacement of the plasticizing cylinder.

In a known injection molding unit of the above-outlined type, as disclosed, for example, in German Offenlegungsschrift (non-examined published patent application) No. 3,229,223, the plasticizing cylinder and the carrier block which is provided with a trickle chute as well as a supply device for the synthetic material, constitute a structural unit. Except for the supply device for the synthetic material which may be removed from the structural unit, the latter is, as a whole, intended and adapted for replacement in the injection molding machine. In the working position the unit is, with the aid of the coupling device, connected to the remaining component assembly of the injection molding unit. The diametrically arranged slidable locking bolts of the coupling device which effect the above-noted connection, are radially slidably supported in the housing of the remaining component assembly of the injection molding unit and engage, with cooperating oblique surfaces, behind a radial terminal flange of the carrier block. Consequently, a replacement of the plasticizing cylinder is possible only by disconnecting and moving away the entire structural unit formed of the plasticizing cylinder and the carrier block, from the remaining component assembly of the injection molding unit. For this purpose, the locking bolts of the coupling device are moved into their withdrawn, releasing position when the structural unit is secured to the hoist mechanism which performs the removing operation.

Since a synchronous engagement with the locking bolts - which are driven by separate hydraulic devices and which function as wedges - is inherently not possible, the locking bolts have, during the coupling procedure, a de-centering effect on the structural unit formed of the plasticizing cylinder and the carrier block. Furthermore, the new injection techniques increasingly require longer plasticizing cylinders in which even slight centering errors result in significant positioning errors at the nozzle.

SUMMARY OF THE INVENTION

It is an object of the invention to provide an improved injection molding unit of the above-outlined type in which the asymmetries of the plasticizing cylinder relative to the axis of injection caused by manufacturing tolerances or by the engagement of the locking bolts of the coupling device are—with reasonable technological input—avoided without adversely affecting the removal operation of the plasticizing cylinder.

This object and others to become apparent as the specification progresses, are accomplished by the invention, according to which, briefly stated, the locking bolts which serve for the axial immobilization of the plasticizing cylinder and which are guided on the carrier block can be introduced into a locking groove of the plasticizing cylinder by means of a program-controlled power cylinder and wherein at least one power cylinder is designed for performing an axial, releasing stroke by means of which the plasticizing cylinder may be freed from the carrier block to be then supported by backing components. Further, a stopping device is provided for immobilizing the plasticizing cylinder during the releasing stroke. The stopping device engages the plasticizing cylinder externally of the carrier block.

By virtue of the structural features outlined above, the plasticizing cylinder which is axially displaceably supported in the central bore of the carrier block, is axially immobilized in the working position exclusively by the engagement of the locking bolts of the coupling device. This arrangement has the advantage that the plasticizing cylinder uncoupled from the injection molding unit is released (freed) from its carrier block and thus also from components which, themselves, have no functions in connection with the plasticizing or the supply of the synthetic material. By virtue of the releasing stroke conditions are provided for an initial fixed and permanent integration of the carrier block with the injection molding unit. By freeing the plasticizing cylinder to be exchanged, from unnecessary ballast, the handling of the plasticizing cylinder during transport and in storage is significantly facilitated.

The necessary technological input for achieving the releasing stroke is particularly small if, according to a further feature of the invention, the same power cylinders are used for this purpose as for the attachment of the entire injection molding unit to or the removal thereof from the injection mold assembly. In such a case, the increased axial stroke need only be divided into corresponding portions which should be, as a rule, separated from one another in time. The first stroke portion serves for the thermal separation of the plasticizing cylinder from the injection mold assembly by withdrawing the entire injection molding unit from the injection mold assembly. The second portion of the increased stroke of the power cylinders serves as the releasing stroke, after the slidable locking bolts have been moved into their withdrawn, releasing position and after the plasticizing cylinder has been axially immobilized. The technological input and the involved expense for a mass produced installation of the additional mechanisms for a computer-controlled exchange of the plasticizing cylinder remain well in the reasonable range, including a stationary support on which the plasticizing cylinder rests subsequent to the releasing stroke and which clears the upward path for the removal of the unit.

According to a further feature of the invention, the plasticizing cylinder is axially firmly locked in the carrier block. This makes possible that periodic axial loads of the plasticizing cylinder exerted by the injection strokes of the feed screw may result in corresponding axial follow-up motions of the plasticizing cylinder and radial follow-up motions of the arresting bolts, the latter leading to an axial immobilization.

According to still another feature of the invention, a radial pin prevents a relative rotary motion between the carrier block guide component and the plasticizing cylinder. The locking bolts engage the radial pin symmetrically at the time the plasticizing cylinder is taken out of the carrier block.

According to still another feature of the invention, all coupling devices may be actuated by a single piston-and-cylinder unit, with the intermediary of a single ejector element.

BRIEF DESCRIPTION OF THE DRAWING

FIG. 1 is a schematic side elevational view, partially in section, of an injection molding unit, incorporating the invention.

FIG. 2 is a sectional view taken along line II—II of FIG. 1.

FIG. 2A is a sectional view taken along line IIa—IIa of FIG. 7.

FIG. 6 is a sectional view, on an enlarged scale, taken along line VI—VI of FIG. 5.

FIG. 7 is sectional view, on an enlarged scale, taken along line VII—VII of FIG. 5.

FIG. 9 is a rear elevational view of the plasticizing cylinder of the injection molding unit.

FIG. 10 is a side elevational view of the plasticizing cylinder of the injection molding unit.

FIG. 11 is a top plan view of the plasticizing cylinder of the injection molding unit.

FIG. 13 is a sectional view taken along line XIII—XIII of FIG. 12 wherein locking bolts of the coupling device are illustrated in the coupling position.

FIG. 14 is a view similar to FIG. 13, illustrating the locking bolts in a releasing position.

FIG. 16 is a sectional elevational view of another, second preferred embodiment of the invention shown in an illustration similar to FIG. 12.

FIG. 19 is a perspective view of a slidable locking bolt of the coupling device according to the second preferred embodiment.

FIG. 20 is a perspective view of a slidable clamping bolt of the coupling device.

FIG. 21 is a perspective view of an expander element.

FIG. 23 is a sectional view of one part of the structure shown in FIG. 17 illustrated on an enlarged scale.

FIGS. 24 to 30 represent a variant of the second preferred embodiment (FIGS. 16-23) in illustrations corresponding to FIGS. 23 and 17-22, respectively.

DESCRIPTION OF THE PREFERRED EMBODIMENTS

Figure 3:
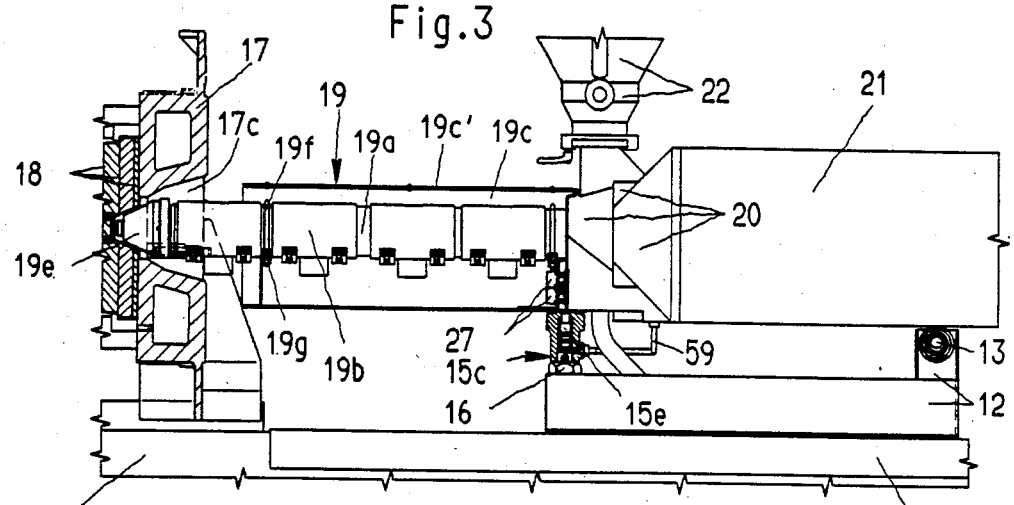
FIG. 3 is a schematic side elevational view, partially in section, of one part of FIG. 1, illustrating the injection molding unit according to a preferred embodiment of the invention, shown in its position inserted on the injection mold assembly.

On a quadratic machine stand 10, having a cover 11, an injection molding unit and a mold closing unit are arranged with respect to one another such that a plasticizing cylinder 19a may be axially inserted on or withdrawn from the injection mold assembly 18, received in the mold closing unit, by two power cylinders F (FIGS. 2, 13, 14). A hydraulic injection cylinder 34, 39 (FIG. 12) effects the injection strokes of a feed screw 24 which is axially shiftably received in the plasticizing cylinder 19a and which is provided with a drive 41 to impart rotation thereto.

The injection molding unit is axially shiftably supported on columns 14 by means of carrier blocks 20, 40. The columns 14 are, at their end faces, secured to a stationary mold clamping plate 17. The pistons 53 (FIGS. 13, 14) of the power cylinders F are fixedly secured to a respective column 14. The cylinders 52 of the power cylinders F and the cylinder 39 of the hydraulic injection cylinder 34, 39 form, together with the carrier blocks 20, 40, a rigid structural unit in which the cylinder 52 is centered in the carrier blocks 20, 40.

The above described structure corresponds to that disclosed in German Patent Application No. P 34 47 597.4 which is incorporated herein by reference.

When the pistons 53 are charged at their frontal or rear surface, the injection molding unit is withdrawn from or, respectively, inserted onto the injection mold assembly 18. The piston 34 of the hydraulic injection cylinder 34, 39 and its piston rod 34a coaxially surround a spindle 31 which terminates at the front in a coupling portion 31a. The spindle 31 surrounds, at its rear terminus, the drive shaft 41b of the motor 41 which rotates the feed screw 24. As may be seen particularly in FIG. 12, the motor 41 is coupled by means of a securing flange 41a and a centering attachment 41c to a coupling flange 43 which, in turn, is affixed to the hollow piston rod 34a. The drive shaft 41b is fixedly secured by means of a spline 49 to the spindle 31 which is coupled to the piston rod 34a by means of an overrunning clutch 42. The latter permits a free rotation of the spindle 31 with respect to the shaft 41b only in one rotary direction.

At the front the spindle 31 is connected to the feed screw 24 by the coupling portion 31a by means of a centrally controllable coupling device 35. The feed screw 24, the coupling device 35, the spindle 31, the piston 34 with the piston rod 34a and the motor 41 move as a unit in the course of the injection stroke, during which the axial motion of the piston 34 is transmitted to a flange 31b of the spindle 31 and thus eventually to the feed screw 24 with the intermediary of a thrust bearing 32. On the frontal side of the flange 31b there is arranged a combined radial/axial (thrust) bearing 33.

The injection molding unit which is surrounded in the zone of the hydraulic driving assemblies by a protective cover 21 is supported on support rollers 13 of a support member 12. As may be seen particularly in FIG. 2, the injection molding unit rests on two supporting rollers 13 with strip-like, crimped-in horizontal edges of the two vertical walls of the cross-sectionally approximately quadratic cover 21. This arrangement permits the injection molding unit to be displaced on the support rollers 13 parallel to the injection axis A, for example, during the releasing stroke. The support rollers 13 are height adjustable by an eccentric device.

The carrier block 20 accommodates, over an upper central opening, a reservoir 22 which contains the synthetic material. The latter may be introduced from the reservoir 22 through a trickle channel into the inlet opening 28 of the plasticizing cylinder 19a (FIGS. 10 and 11).

As seen in FIG. 2, in conjunction with FIG. 7, the columns 14 are mounted in clamping sleeves 15b of a support yoke 15 which, in turn, is held on the support 12 of the machine stand 10 by means of centering carrier elements 16. Each carrier element 16 has a centering pin 16a which projects into a corresponding bore provided in the support yoke 15. The carrier elements 16 are, to a limited extent, height-adjustable by means of setting nuts 16b. A clamping nut 16c serves as securing means on the support member 12.

Figure 12:
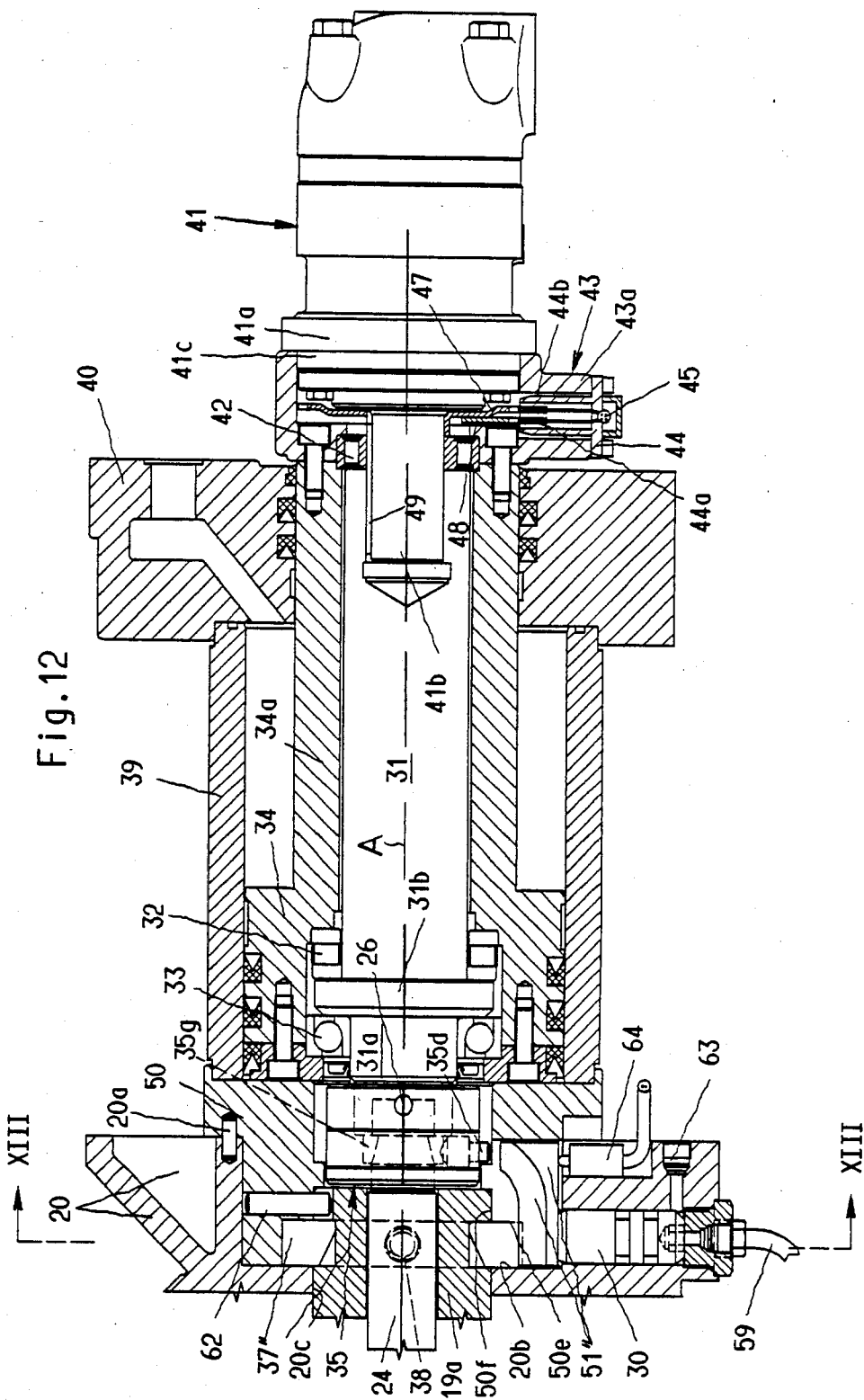
FIG. 12 is a sectional elevational view, on an enlarged scale, of one part of the injection molding unit.
Figure 15:
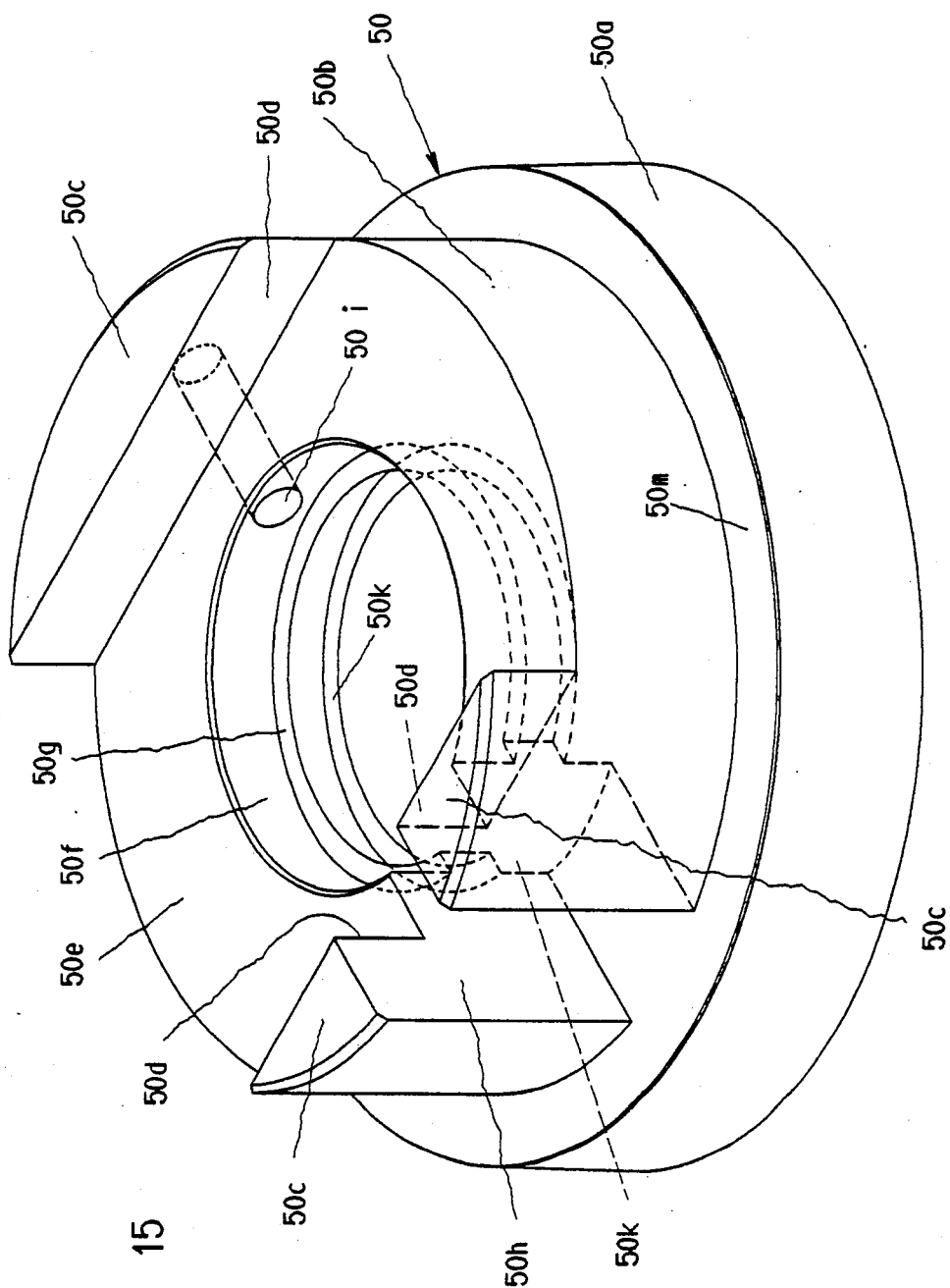
FIG. 15 is a perspective view, on an enlarged scale, of a guide body for the injection molding unit.

The plasticizing cylinder 19a is releasably attached to the carrier block 20 by means of a coupling device (FIGS. 12, 13, 14). The coupling device engages directly the plasticizing cylinder 19a which projects, in a form-locking manner, into a central bore of the carrier block 20 (FIG. 12). The coupling device has two locking bolts 37" which are slidable in guide tracks arranged diametrically relative to the injection axis A. The guide tracks are bounded at the front by guide faces 20b of the carrier block 20 and, at the rear terminus, by guide faces 50e, 50d (FIG. 15) of a rotationally symmetrical guide body 50. The latter projects with an axial portion 50b of small diameter in a form-fitting manner into a corresponding recess of the carrier block 20 and engages the carrier block 20 with circular segment-shaped axial engagement faces 50c and with an annular shoulder 50m (FIG. 15). The carrier block 20 and the guide body 50 together form a centering block 20, 50 in which the plasticizing cylinder 19 is centered on the inner surfaces of the centering block 20, 50 in the zones in front of and behind a circumferential locking groove 29 provided in the plasticizing cylinder 19a. The locking bolts 37" engage, in the locking position, into the locking groove 29 (FIGS. 12, 13, 14) and lie against annular shoulders of the plasticizing cylinder 19a which bound the locking groove 29. The annular shoulders lie in planes which are oriented perpendicularly to the plasticizing cylinder 19a. The coupling engagement of the locking bolts 37" thus effects a radial lock in which the locking bolts engage the annular shoulders of the locking groove 29 as well as the guide surface 50e (FIG. 15) of the guide body 50. The plasticizing cylinder 19a is radially secured by means of a pin 62 which projects into a recess 19m of the plasticizing cylinder 19a and which is anchored in the guide body 50. The latter, in turn, is secured to the carrier block 20 by means of a securing pin 20a and is thus prevented from rotating relative thereto. As is particularly well seen in FIG. 12, the centering block 20, 50 is supported axially on a carrier block 40 by means of the cylinder 39. Both carrier blocks 20 and 40 are tightened to one another axially by means of securing elements 65 (FIGS. 2, 13 and 14). The locking bolts 37" may be shifted from their locking position by means of a wedge-shaped part 51a" of an expander element 51" against the effect of springs 38 when the wedge-shaped part 51a" is moved between the locking bolts 37". During this occurrence, the releasing stroke is axially limited by the fact that the shoulders 51b" of the expander element 51" engage the lateral edges of the locking bolts 37" (FIG. 14). The expander element 51" is driven by a hydraulically charged piston 30 which is shiftably supported in a vertical bore of the carrier block 20 and which is chargeable with a pressurized hydraulic medium introduced by a conduit 63. The springs 38 are held in horizontal blind bores of the locking bolts 37" and are, at their rear terminus, in engagement with inner surfaces of the carrier block 20 (FIGS. 12, 13, 14, 15).

At the rear, the feed screw 24 terminates in an end portion 24b (FIGS. 10, 11) provided with a radial groove 25 for a carrier pin 26 (FIGS. 12, 16). This terminal portion of the feed screw 24 is also provided with a circumferential groove 24a.

Figure 5:
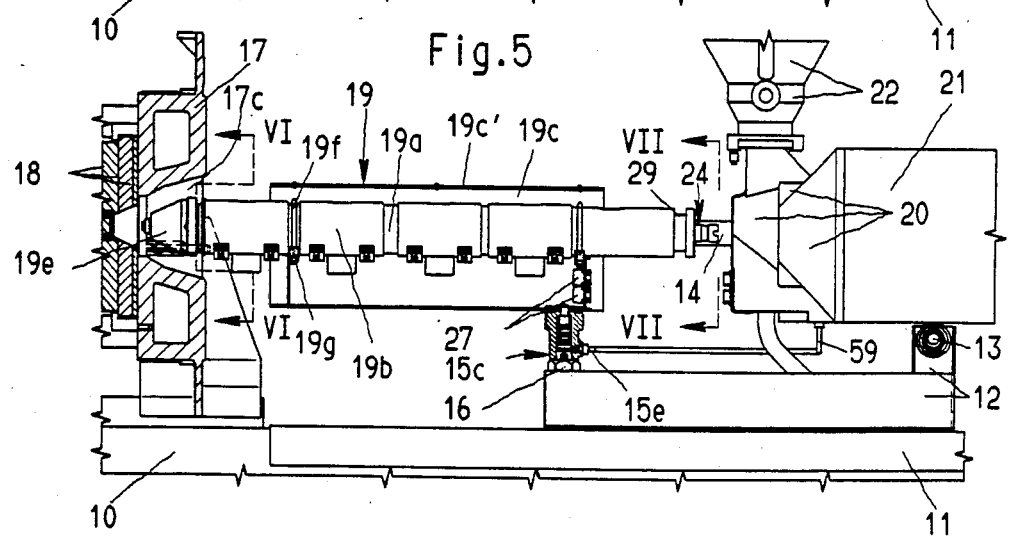
FIG. 5 is an illustration similar to FIGS. 3 or 4, showing a position subsequent to the performance of a releasing stroke for the plasticizing cylinder.
Figure 8:
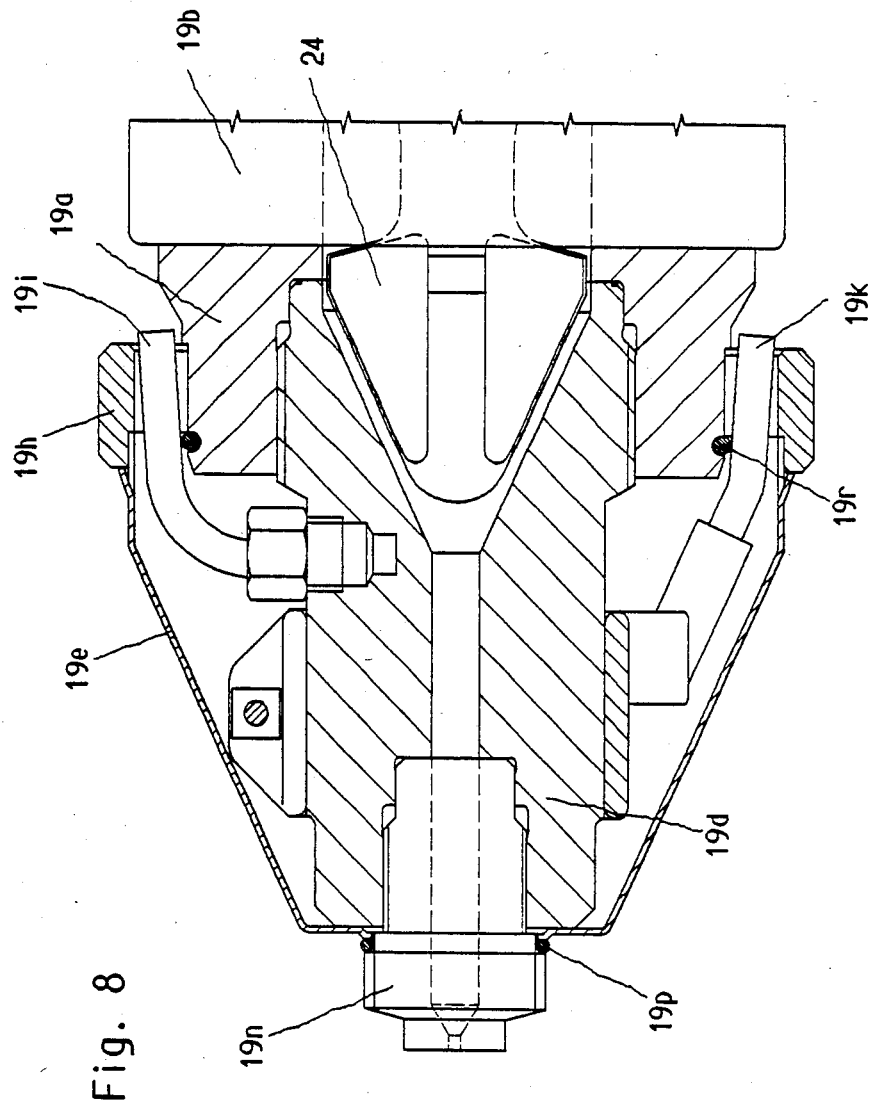
FIG. 8 is a sectional view, on an enlarged scale, of the nozzle-side terminal portion of the plasticizing cylinder unit.

The coupling device 35 which axially connects the feed screw 24 with the coupling portion 31a of the spindle 31 and which is also designed to transmit a torque of the spindle 31 to the feed screw 24, comprises locking bolts 35g which, in the locking position, extend into the circumferential groove 24a and which are arranged and controlled in a manner similar to the locking bolts 37" of the coupling device for the plasticizing cylinder 19a. The locking bolts 35g held by means of springs in the locking position are withdrawn from the locking position by means of a releasing (unlocking) member 35d vertically displaceably supported in a housing of the coupling device 35. As shown in FIG. 5, the unlocking member 35d has a conical tip which may be introduced between the locking bolts 35g of the coupling device 35. The unlocking member 35d is situated in the path of motion of the expander element 51" which is extended in the direction of the injection axis A. Thus, by means of an unlocking stroke of the expander element 51", the locking bolts 37" at the plasticizing cylinder 19a as well as the locking bolts 35g (FIG. 12) at the feed screw 24 may be withdrawn from their locking position.

During the releasing stroke the plasticizing cylinder 19a is axially immobilized by a stopping device which is arranged on the stationary support yoke 15. The stopping device comprises a hydraulic piston 15e (FIG. 2A) which has a stopping pin 15d that may be advanced into a stop hole 61 of the cover 19c of the plasticizing cylinder 19a against the force of the spring 15f. The piston 15e forms, with a part centrally formed on the horizontal web of the support yoke 15, the hydraulic stopping cylinder 15c which may be charged with a pressurized hydraulic fluid introduced by a pressure conduit 59. The hydraulic driving systems of the coupling devices associated with the plasticizing cylinder 19a and the stopping cylinder 15c communicate with one another by means of the common pressure conduit 59.

As may be seen particularly in FIGS. 8–11, the plasticizing cylinder 19a comprises heating bands 19b, a cover 19c having a rectangular cross section, a nozzle body 19d and a nozzle tip 19n. The plasticizing cylinder 19a is held by means of a clamping yoke 19f on horizontal support parts 19g within the cover 19c. The support components 19g are, in turn, supported in vertical walls of the cover 19c. The latter is, as seen particularly in FIGS. 9, 10 and 11, made of a lower sheet metal body bent in a U-shape, an upper cover sheet and a reinforcing plate 68 (FIGS. 2A and 10) at the stop hole 61. By means of the releasing stroke, electric and hydraulic coupling terminals 27 and 56 may be disconnected. The cylinder-side coupling parts of the terminals are arranged on a vertical carrier plate 27a within the cover 19c, while the other cooperating coupling parts are arranged on the carrier block 20.

After the releasing stroke, the plasticizing unit 19, 24 can be supported at its rear terminus on the end face of the vertically arranged stopping cylinder 15c of the stopping device. At the same time, the cover 19c of the plasticizing cylinder 19a is immobilized between centering ribs 15a of the support yoke 15 (FIG. 7). The plasticizing cylinder 19a has a concentrically arranged centering ring 19h in the zone of the nozzle body 19d. Between the nozzle tip 19n and the centering ring 19h the nozzle body 19d is concentrically surrounded by a generally conical cover 19e which, at its frontal terminus, extends radially across the front end of the nozzle body 19d and is affixed to the nozzle tip 19n by means of a holding ring 19p. The centering ring 19h sits on a reduced-diameter, cylindrical end portion of the plasticizing cylinder 19a and is axially secured thereon by a holder ring 19r.

Referring to FIG. 6, in attachments 17a of the mold carrier 17 there are anchored, within a passage 17c, support pins 17b which extend parallel to the injection axis A. The support pins 17b are situated underneath the injection axis A and are oriented symmetrically to a vertical symmetry plane containing the injection axis. The plasticizing unit 19, 24 is axially slidably supported on and centered by the support pins 17b and the centering ring 19h. An electric nozzle sensor conductor and a terminal for the nozzle heating band 19b are designated at 19i and 19k respectively.

The terminal portion of the coupled plasticizing cylinder 19a is, in the centering block 20, 50 centered in axial zones in front and behind the locking groove 29 at a centering face 20c of the carrier block 20 and a centering face 50f of the guide body 50 as seen in particular in FIGS. 12 and 15. For this purpose, the rearward end face of the plasticizing cylinder 19a axially lies against an inner annular shoulder 50g (FIG. 15) of the guide body 50. An axial passage 50h provided in the guide body 50 serves for receiving and guiding the expander element 51''. A radial bore 50i provided in the guide body 50 receives the pin 62 for radially securing the plasticizing cylinder 19a, while an annular groove 50k makes possible a rotation of the unlocking component 35d rotating together with the coupling device 35. A control switch 64 disposed in a corresponding recess of the carrier block 20 engages the expander element 51'' with a radially displaceable switching element which is in its initial position and monitors whether the locking bolts associated with the plasticizing cylinder 19 and the feed screw 24 are withdrawn from or advanced into a locking position at the time required. It is an essential function of the control switch 64 to interrupt the program of the computer controlling the injection molding machine if the expander element 51'' does not perform its unlocking stroke before returning in the initial position. In the undisturbed changing operation the control switch 64 is safeguarding the proceeding of the changing program by delivering a control signal to the computer in both end positions of the expander element 51''. In case no control signal is delivered, the changing operation is stopped by the computer to prevent damages.

When the injection molding unit is, by means of the power cylinders F (FIGS. 2, 13, 14) moved from the position shown in FIGS. 1 and 3 into a position shown in FIG. 2, the releasing stroke for the plasticizing unit 19, 24 has been prepared for execution in that the arresting hole 61 (FIGS. 9, 10, 11) in the cover 19c is situated in alignment with the vertical motion path of the stopping pin 15d. Thereafter, the locking bolts of the coupling devices in the plasticizing cylinder 19a and the feed screw 24 are withdrawn.

Figure 4:
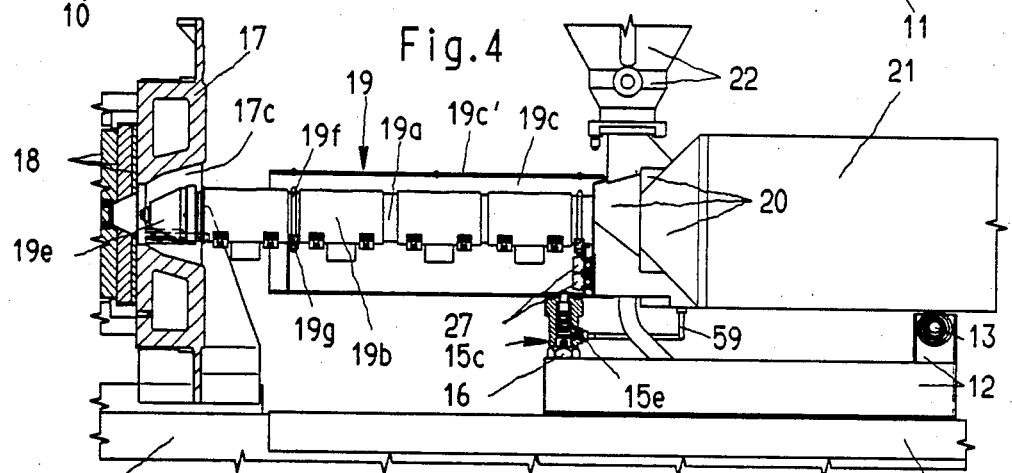
FIG. 4 is a view similar to FIG. 3, showing the injection molding unit in a position withdrawn from the injection mold assembly.

Subsequently, the releasing stroke for the plasticizing unit is performed during which the injection molding unit is moved on the support rollers 13 from a position shown in FIG. 4 into a position shown in FIG. 5. This renders the plasticizing unit 19, 24 free and ready for removal by a transporting device. During the removal process, gripper components of a transport mechanism grasp the plasticizing unit 19, 24 at hoist attachments 60 which are situated behind the center of gravity of the plasticizing unit 19, 24. As a result, the plasticizing unit assumes, when raised by the hoist, an oblique position which makes possible for its frontal end to slide out from the passage 17c of the stationary clamping plate 17. The stroke of the power cylinders F which withdraws the injection molding unit from the injection mold assembly may, however, be so designed that the plasticizing unit 19, 24 can be lifted out of the associated injection molding machine without the need of assuming an oblique position.

In the description which follows, the common features of the two embodiments illustrated in FIGS. 16–23 and 24–30, respectively, will be set forth.

The coupling for the plasticizing cylinder comprises two hydraulically actuatable, essentially radially guided, wedge-shaped clamping bolts 137, 137' having self-locking oblique surfaces 137a, 137a' which provide that the plasticizing cylinder 19a, 19a' can be axially immobilized (clamped) by slight axial camming displacements of the oblique faces 137a, 137a'. The oblique faces 137a and 137a' are oriented in such a manner on the clamping bolts 137, 137' that the direction of the axial clamping motion corresponds to the direction of an axial follow-up motion of the plasticizing cylinder 19a, 19a'. Such an axial follow-up motion is caused by axial forces derived from the periodic injections. By virtue of the axial clamping motion, the plasticizing cylinder 19a, 19a' is axially pressed onto radial locking faces 37d, 37d' of the respective locking bolts 37, 37'. The clamping bolts 137, 137' and the locking bolts 37, 37' are radially guided within the centering block 20, 50'; 20, 50'' in a diametral arrangement relative to the plasticizing cylinder 19a, 19a'. The centering block of the first embodiment (FIGS. 16–23) is formed of the carrier block 20 and the guide body 50', whereas the centering block of the second embodiment (FIGS. 24–30) is composed of the carrier block 20 and the guide body 50''. The clamping bolts 137, 137' directly engage the plasticizing cylinder 19a, 19a'. In their locking position the clamping bolts 137, 137' engage behind the end faces 19s, 19s' of the plasticizing cylinder 19a, 19a, respectively (FIGS. 17, 23, 24, 25). The locking bolts 37, 37' engage, in their locking position, into the annular groove 29 of the plasticizing cylinder 19a, 19a'. As a result, the plasticizing cylinder 19a, 19a' is, by means of a radial shoulder 19t, 19t' bounding the rear part of the annular groove 29, axially pressed against the locking bolts 37, 37'. The clamping bolts 137, 137' are, at their rear part, guided on the guide body 50', 50'' into which projects, in a form-fitting manner, a bore provided in the carrier block 20 and oriented coaxially with the plasticizing cylinder 19a, 19a'. The clamping bolts 137, 137' and the locking bolts 37, 37' are arranged between the carrier block 20 and the guide body 50', 50" in a common guide channel of the centering block 20, 50' or 20, 50". The guide channel is bounded by diametrical guide faces 50d', 50d"; 50e, 50e' of the guide body 50', 50" (FIGS. 22 and 30) which lies with end faces 50c', 50c" against the carrier block 20.

Figure 18:
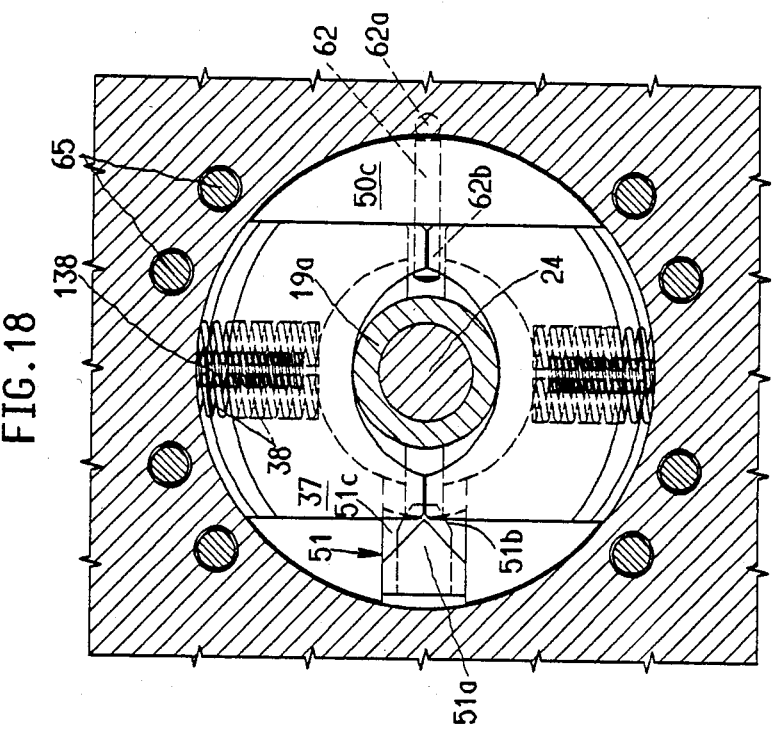
FIG. 18 is a sectional view taken along line XVIII—XVIII of FIG. 17.
Figure 17:
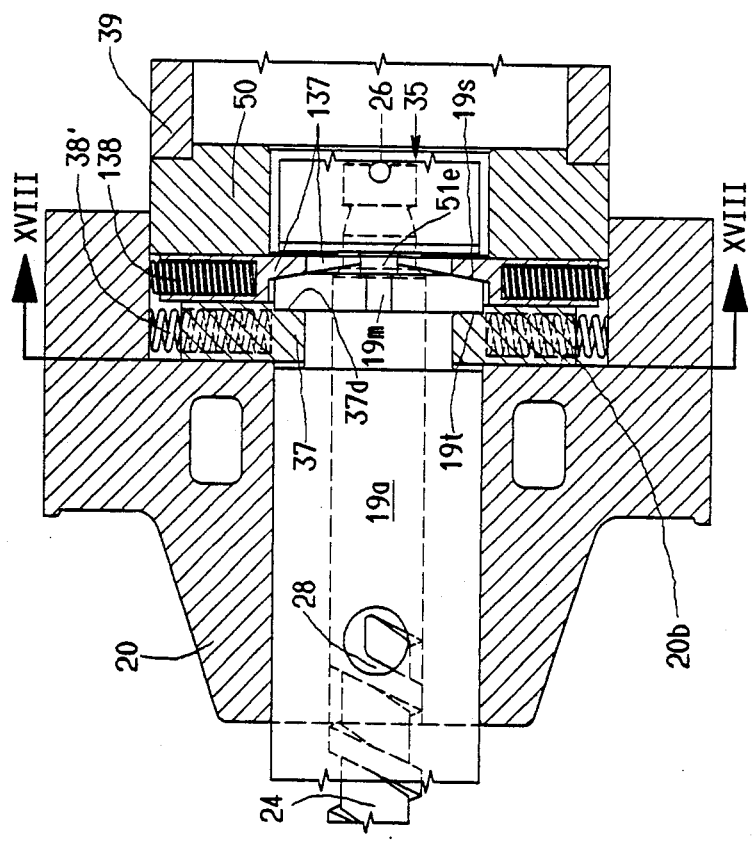
FIG. 17 is a sectional view, on an enlarged scale, of one part of the structure shown in FIG. 16.
Figure 22:
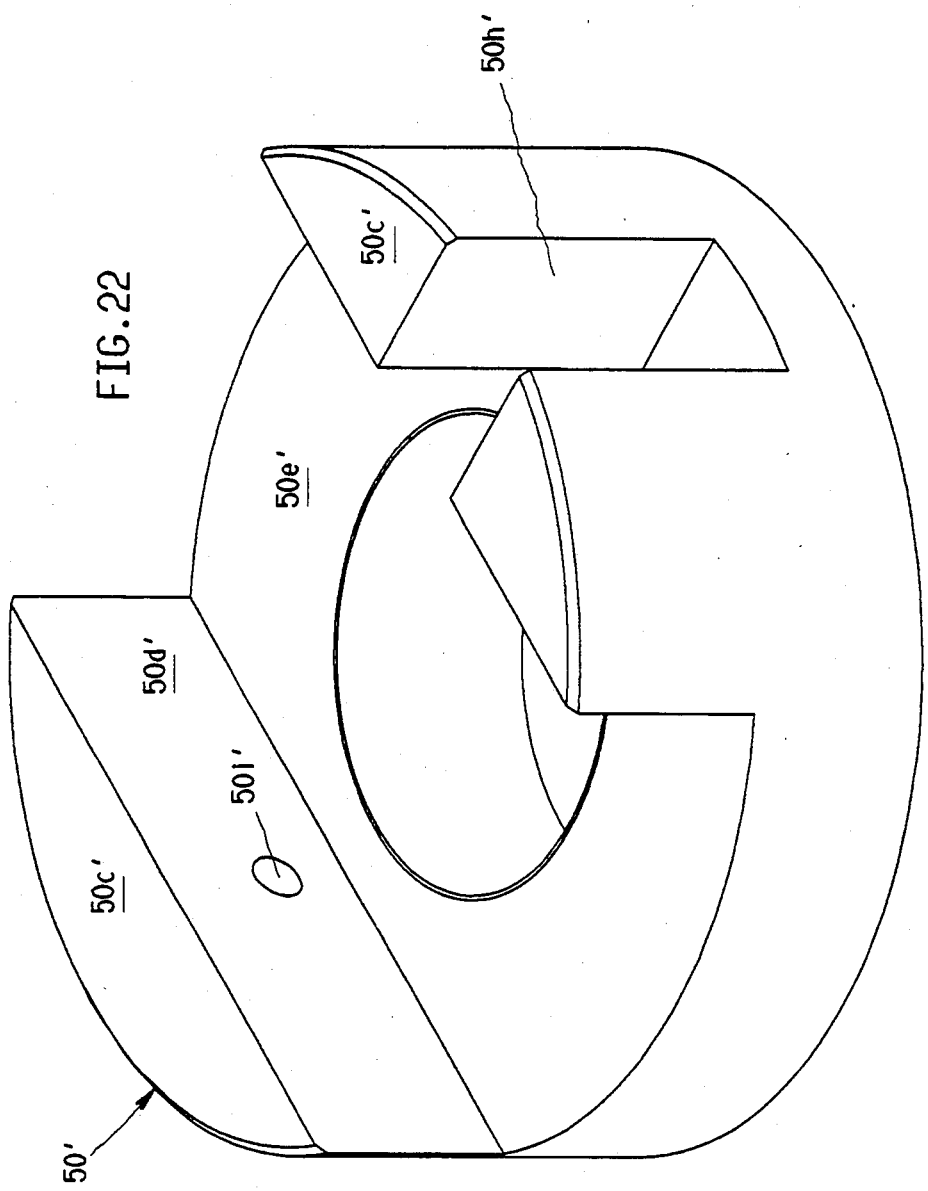
FIG. 22 is a perspective view of a guide body of the injection molding unit according to the second preferred embodiment.
Figure 30:
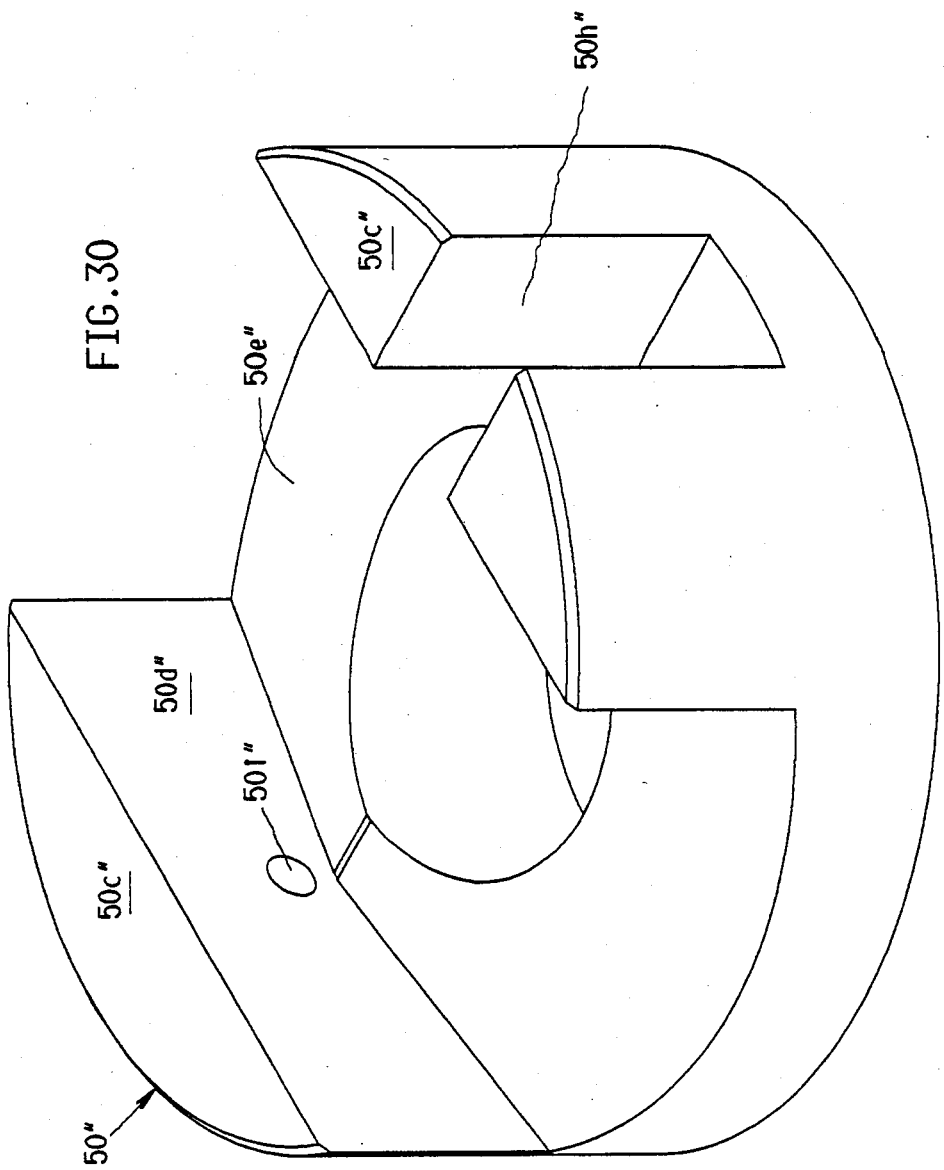

The expander element 51, 51' is radially guided in the passage 50h', 50h" of the respective guide body 50', 50". The plasticizing cylinder 19a, 19a' is secured against rotation by means of a pin 62 which itself is prevented from rotating in the carrier block 20 and which traverses the guide body 50, 50' through a bore 50i", 50i''' (FIGS. 22 and 30). The rear terminus 62a of the pin 62 projects into a recess provided in the carrier block 20. The free end 62b of the pin 62 projects between the end faces 137e, 137e' of the respective clamping bolts 1 137, 137' (FIGS. 16, 18 and 26). This arrangement ensures that the clamping bolts 137, 137' remain in a position symmetrical to the cylinder axis even when the plasticizing cylinder 19a, 19a' is taken out of the cylinder block 20. In such a case the end faces 137e, 137e' lie against the pin end 62b which projects into a recess 19m of the plasticizing cylinder 19a, 19a' for securement against rotation.

The clamping bolts 137, 137' and the locking bolts 37, 37' which are biased at their rear terminus by respective springs 38', 38" and 138, 138' may be moved (pushed) out of their locking position by means of a hydraulically drivable wedge-shaped expander element 51, 51' (FIGS. 21, 29) which may be driven in between the clamping bolts and the locking bolts.

Turning to FIGS. 21 and 29, the one-piece expander element 51, 51' has ejector surfaces 51a, 51a' and 51b, 51b' which are oriented obliquely to the radial path of motion of the expander element. The expander element 51, 51' extends axially over the locking bolts 37, 37', the clamping bolts 137, 137' as well as the coupling device 35 for the feed screw 24. The ejector faces 51a, 51a' which are situated at the axial portion of the locking bolts 37, 37', are oriented at an angle α to its symmetry plane s—s. The angle α is greater than the corresponding angle β of the oblique ejector faces 51b, 51b' in the axial portion of the clamping bolts 137, 137'. The angle β has a magnitude of approximately 40° which is relatively small. By virtue of this arrangement, even a relatively strong wedging of the clamping bolts 137, 137' may be released with a relatively small hydraulic force. The oblique ejector faces 51b, 51b' in the zone of the clamping bolts 137, 137' are arranged in the ejecting direction in such a manner in front of the oblique ejector faces 51a, 51a' in the zone of the locking bolts 37, 37' that an axial clamping of the plasticizing cylinder 19a, 19a' is released before the oblique ejector faces 51a, 51a' engage the locking bolts 37, 37'. This arrangement ensures that each time first the clamping bolts 137, 137' are withdrawn and only thereafter are the locking bolts 37, 37' (freed from the wedged position) pushed out. The oblique ejector faces 51b, 51b' and 51a, 51a' cooperate with oblique shoulders 137c, 137c' and 37c, 37c' of the clamping bolts 137, 137' and, respectively, the locking bolts 37, 37'. A wide, approximately quadratic portion 51c, 51c' of the expander element 51, 51' actuates, during the ejecting stroke, the wedge member 35d which, in turn, pushes apart the locking bolts 35g which thus move out of the circumferential rearward groove 24a of the feed screw 24. The working face of the portion 51c is relatively wide and may be of concave configuration (FIG. 21). This ensures that the ejecting wedge 35d rotating with the feed screw 24 is exposed to an actuating force even if it is not oriented precisely radially to the symmetry plane s—s of the expander element 51, 51'.

Referring to FIG. 16, a piston 30 which actuates the expander element 51, 51' is guided in a radial bore of the carrier block 20. The stroke of the piston 30 is limited by its engagement with a radial flange 30a at an annular shoulder of the carrier block 20. The expander element 51, 51' is operatively connected with a control switch 64 by means of an actuating element 67. The switch 64 is secured to the outside of the carrier block 20. The actuating element 67 formed by a sheet metal strip is anchored, with a crimped end, in a groove 66, 66' of the expander element 51, 51' and operates the control switch 64 by means of particular actuating tongues 67a, 67b which affect particular switching elements of the control switch 64, which are situated in a horizontal plane (the rearward switching elements are not visible in FIG. 16). The hydraulic piston 30 is supplied with a pressurized medium by hydraulic conduits 59, 63. After withdrawal of the clamping bolts 137, 137' and the locking bolts 37, 37', the carrier block 20 is drawn off by means of a corresponding reverse stroke of the power cylinders F from the axially immobilized plasticizing cylinder 19a, 19a' so that the latter is ready for transportation to effect replacement.

In the description which follows, the differences between the construction shown in FIGS. 16–23 and the variants illustrated in FIGS. 24–30 will be set forth.

In the construction according to FIGS. 16–23, the oblique faces 137a (FIGS. 20, 23) are arranged on a semicircular, rearwardly extending shoulder 137b of the clamping bolts 137 which have parallel outer guide faces 137d. The oblique faces 137a lie, in the clamping position, on the cooperating oblique faces 19s of the end face of the plasticizing cylinder 19a. The locking bolts 37 are each provided with a centering shoulder 37b (FIGS. 19, 23) which, in the locking position, engage the circumference of the plasticizing cylinder 19a.

In the embodiment according to FIGS. 24–30 the rear sides of the clamping bolts 137' are formed as oblique faces which lie against the oblique faces 50e' of the guide body 50'.

With the constructions illustrated in FIGS. 16–30 the following steps required for a replacement of the plasticizing unit are performed, starting from the FIG. 1 position and also referring to FIGS. 1–7 and 9–11:

The injection molding unit is withdrawn from the injection mold assembly 18 by a stroke of the hydraulic power cylinders F. Thereafter, the clamping bolts 137, 137' and the locking bolts 35g of the coupling device 35 for the feed screw 24 (FIG. 16) and, with a slight delay thereafter, the locking bolts 37", 37, 37' for the plasticizing cylinder are withdrawn from the locking position by a radial stroke of the ejector element 51, 51'. At the same time, the plasticizing cylinder 19a, 19a' is axially immobilized by the fact that the stopping pin 15d (FIGS. 7, 9, 10) is advanced by the hydraulic power cylinder 15c into the stop hole 61 (FIGS. 10, 11) of the lower horizontal wall of the cover 19c. Thereafter, the immobilized plasticizing cylinder 19a, 19a' is freed from the carrier block 20 by a further stroke (releasing stroke) effected preferably by the power cylinders F. As seen particularly in FIGS. 9 and 10, the electric connections 27 and the hydraulic connections 56 ar mounted on a vertical carrier panel 27a within the cover 19c. The connecting terminals correspond with coupling terminals (not shown) on the carrier block 20. Such an arrangement necessarily results in a separation of the electric conductors and hydraulic conduits for the plasticizing cylinder from the coupling terminals 27, 56 during the course of the horizontal releasing stroke. After the releasing stroke the plasticizing unit rests with a lower horizontal setting face of the cover 19c rearwardly on a horizontal web of the support yoke 15 at the rear and on support pins 17b (FIGS. 1 and 6) of the stationary mold carrier 17 in the front. The released (freed) plasticizing unit may then be lifted and transported away for storage with the aid of a hoist engaging the hoist attachments 60 (FIG. 11).

The plasticizing unit taken from storage and intended to be installed in the injection molding unit is positioned by the hoist on the horizontal web of the support yoke 15 and the support pins 17b of the mold carrier 17. Thereafter, the other parts of the injection molding unit are, with the centering block 20, 50 or 20, 50' or 20, 50" brought into a position according to FIGS. 16–18 or 23 or 24–26 by an engagement stroke (which is opposite to the releasing stroke) of the power cylinders F. In that position the plasticizing cylinder projects in a form-fitting manner into the centering block and the feed screw is torquetransmittingly coupled with the spindle 31 by means of the carrier pin 26. During the engagement stroke the locking bolts 37", 37, 37', the clamping bolts 137, 137' and the locking bolts 35g of the coupling device 35 for the feed screw 24 are in the withdrawn position in which they are held by the expander element 51, 51'.

By means of a reverse stroke of the piston 30, the expander element 51, 51' is brought into its starting position. By virtue of this occurrence, all the above-noted bolts which are at their rear terminus biased by springs, are brought into the locking position by a spring force whereby the oblique faces 137a, 137a' of the clamping bolts 137, 137' execute a small axial clamping motion.

During the first injection stroke of the first injection cycle of the normal injection operation, the plasticizing cylinder 19a, 19a' is placed under an injection load. Although such a load is present already at the time the injection molding unit is placed into engagement with the injection mold assembly 17, the injection load causes a slight axial follow-up motion of the plasticizing cylinder. Such an axial follow-up motion makes possible a corresponding, radially oriented follow-up motion of the spring loaded clamping bolts 137, 137' and results in a strong axial wedging of the plasticizing cylinder countersupported by the locking bolts 37, 37'. During the course of the subsequent cyclic injections such axial wedging may be further strengthened. In the embodiment illustrated in FIGS. 16–23 there is achieved an additional centering effect by the axially wedging engagement of the oblique faces 137a of the clamping bolts 137 on the corresponding oblique faces 19s of the end face of the plasticizing cylinder 19a. The additional centering effect is further reinforced by the engagement of the annular shoulders 37b of the locking bolts 37 on the circumference of the plasticizing cylinder.

The improvements according to the invention serve for an automatic loosening or attaching of the plasticizing cylinder and the feed screw (controlled by the computer of the injection molding machine) in an operation for replacing these components. Such a replacement is required, for example, in case another plastic material has to be handled with another plasticizing cylinder.

It will be understood that the above description of the present invention is susceptible to various modifications, changes and adaptations, and the same are intended to be comprehended within the meaning and range of equivalents of the appended claims.

What is claimed is

1. In an injection molding machine including an injection mold assembly, an injection molding unit, a first drive means for inserting the injection molding unit on and withdrawing it from said injection mold assembly; said injection molding unit including a carrier block having a central longitudinal bore, a plasticizing cylinder normally projecting into said central longitudinal bore and having a longitudinal axis, a feed screw coaxially received in said plasticizing cylinder and being arranged for a rotary motion and an axial shifting motion relative to said plasticizing cylinder, coupling means for releasably axially immobilizing said plasticizing cylinder in said central longitudinal bore relative to said carrier block; said injection molding machine further having a second drive means for rotating said feed screw relative to said plasticizing cylinder, an injection cylinder means for periodically axially shifting said feed screw relative to said plasticizing cylinder and stationary columns supporting said carrier block for displacements thereon together with said plasticizing unit; the improvement wherein said plasticizing cylinder has an outer circumferential locking groove, said carrier block has inner radial guide faces and said coupling means has a plurality of locking bolts radially slidably supported on said radial guide faces; said locking bolts having a locking position in which they project into said circumferential locking groove and an unlocking position in which said locking bolts are radially withdrawn from said circumferential locking groove, a third drive means operatively connected with said locking bolt for causing radial movement thereof into the locking or unlocking positions; a fourth drive means being operatively connected to said plasticizing cylinder for moving said plasticizing cylinder out of said carrier block in the course of an axial releasing stroke of said fourth drive means and while said locking bolts are in said unlocking position; the improvement further comprising a stationarily held support component arranged for supporting said plasticizing cylinder after removal thereof from said carrier block by said fourth drive means; and a stationarily supported stopping device arranged to be brought into an abutting engagement with said plasticizing cylinder externally of said carrier block for stopping said plasticizing cylinder when being withdrawn from said injection mold assembly by said first drive means.

2. An injection molding machine as defined in claim 1, wherein said plasticizing cylinder includes annular shoulders bounding said locking groove and lying in a plane perpendicular to the axis of the plasticizing cylinder; said locking bolts being in engagement with said annular shoulders in said locking position.

3. An injection molding machine as defined in claim 1, further comprising a rotationally symmetrical guide body axially adjoining said carrier block and having a part of reduced diameter form-fittingly projecting into said central longitudinal bore of said carrier block; said guide body having radial guide faces defining, together with said inner radial guide faces of said carrier block, two guide tracks for said locking bolts; said guide tracks being oriented diametrically relative to said plasticizing cylinder.

4. An injection molding machine as defined in claim 3, wherein said carrier block and said guide body together for a centering block having inner surfaces; said plasticizing cylinder being centered within said centering block by said inner surfaces along axial length portions on either side of said locking groove.

5. An injection molding machine as defined in claim 1, wherein said first drive means includes two hydraulic drive cylinders formed in said carrier block and arranged coaxially to respective said guide columns; said hydraulic drive cylinders being arranged on diametrically opposite sides of said central bore of said carrier block; said hydraulic drive cylinders accommodating respective pistons affixed to said guide columns.

6. An injection molding machine as defined in claim 5, further comprising a machine stand, a stationary support bed mounted on the machine stand and a support roller mounted on the support bed; said support roller being arranged for providing a rolling support for said injection molding unit during said releasing stroke; said releasing stroke being effected by said hydraulic drive cylinders.

7. An injection molding machine as defined in claim 1, further comprising a stationary support yoke; wherein said stopping device comprises a stopping cylinder disposed in said support yoke, a stopping piston slidably received in said stopping cylinder and a stopping pin connected to said stopping cylinder; said plasticizing cylinder including a cover provided with a stop hole; said stopping pin being introducible into said stop hole by said stopping piston upon an energization of said stopping cylinder for arresting said plasticizing cylinder when withdrawn from said injection mold assembly by said first drive means 8. An injection molding machine as defined in claim 7, wherein said stopping cylinder is vertically oriented and has a terminal circular edge arranged for supporting said plasticizing cylinder in a substantially horizontal position thereof subsequent to said releasing stroke.

9. An injection molding machine as defined in claim 7, wherein said third drive means comprises a hydraulic cylinder; further comprising a hydraulic conduit maintaining communication between the hydraulic cylinder of said third drive means and said stopping cylinder.

10. An injection molding machine as defined in claim 1, wherein said coupling means further comprises a plurality of clamping bolts situated axially adjacent to said locking bolts and being radially guided; each said clamping bolt having an oblique clamping face; said clamping bolts having a clamping position in which said clamping faces engage said plasticizing cylinder externally of said locking groove and axially press a side of said locking groove against said locking bolts, whereby said plasticizing cylinder is clamped within said carrier block.

11. An injection molding machine as defined in claim 10, wherein each said oblique clamping face is oriented such that a direction of an axial camming motion of each oblique clamping face during a radial displacement towards said clamping position coincides with a direction of axial follow-up motion of the plasticizing cylinder in response to an axially oriented force derived from a injection step performed by said feed screw.

12. An injection molding machine as defined in claim 10, wherein each said clamping bolt has a semicircular shoulder provided with a face constituting said oblique clamping face; said plasticizing cylinder having oblique end faces; in said clamping position said oblique clamping faces being in a pressing engagement with said oblique end faces.

13. An injection molding machine as defined in claim 12, wherein each said locking bolt has a centering shoulder arranged to circumferentially engage said plasticizing cylinder in said locking position, an axial end face and a recess adjoining said axial end face.

14. An injection molding machine as defined in claim 10, further comprising a guide body situated axially adjacent said carrier block and having radial faces and a portion projecting into said central bore of said carrier block; said clamping bolts being guided on said radial faces of said guide body.

15. An injection molding machine as defined in claim 14, further comprising a radially oriented securing pin passing through said guide body and being secured against rotation in said carrier block; said securing pin having an end portion projecting between two said clamping bolts and into a radial recess of said plasticizing cylinder for preventing a rotation of said plasticizing cylinder.

16. An injection molding machine as defined in claim 14, wherein said guide body has oblique guide faces for said clamping bolts, and each clamping bolt has an oblique guide face cooperating with a respective said oblique guide face of said guide body.

17. An injection molding machine as defined in claim 14, wherein said locking bolts and said clamping bolts are each two in number; further comprising springs supported in said carrier block and engaging each locking bolt and each clamping bolt for urging them radially inwardly into respective said locking and clamping positions; said third drive means comprising a wedge-shaped expander element displaceable radially between said locking bolts and said clamping bolts and a hydraulic power means operatively connected with said expander element for driving said expander element radially inwardly whereby said locking bolts and said clamping bolts are forced radially outwardly against the force of said springs into said unlocking position; said expander element having ejector faces oriented obliquely to a radial direction 18. An injection molding machine as defined in claim 17, wherein said expander element has two opposite radial end positions; further comprising switch means secured to said carrier block externally thereof for being actuated by said expander element when reaching either of said end positions.

19. An injection molding machine as defined in claim 17, wherein said expander element is a one-piece component; said expander element extending axially past said locking bolts and said clamping bolts; said expander element having first ejector faces in a zone of the locking bolts and second ejector faces in a zone of said clamping bolts; said expander element having an axial symmetry plane; said first ejector faces being oriented to said symmetry plane at an angle which is greater than an angle defined between each said second ejector face and said symmetry plane.

20. An injection molding machine as defined in claim 19, wherein said first ejector faces being arranged radially outwardly relative to said second ejector faces to such an extent that upon a radially inward displacement of said expander element said clamping bolts are moved by said second ejector faces into a releasing position from their clamping position prior to engagement of said locking bolts by said first ejector faces.

21. An injection molding machine as defined in claim 1, wherein said first and fourth drive means form a single drive mechanism arranged for inserting the injection molding unit on and withdrawing it from said injection mold assembly and for executing said releasing stroke.

* * * * *